W. HOLMES.
Horse Hay Rake.
No. 82,002.
Patented Sept. 8, 1868.
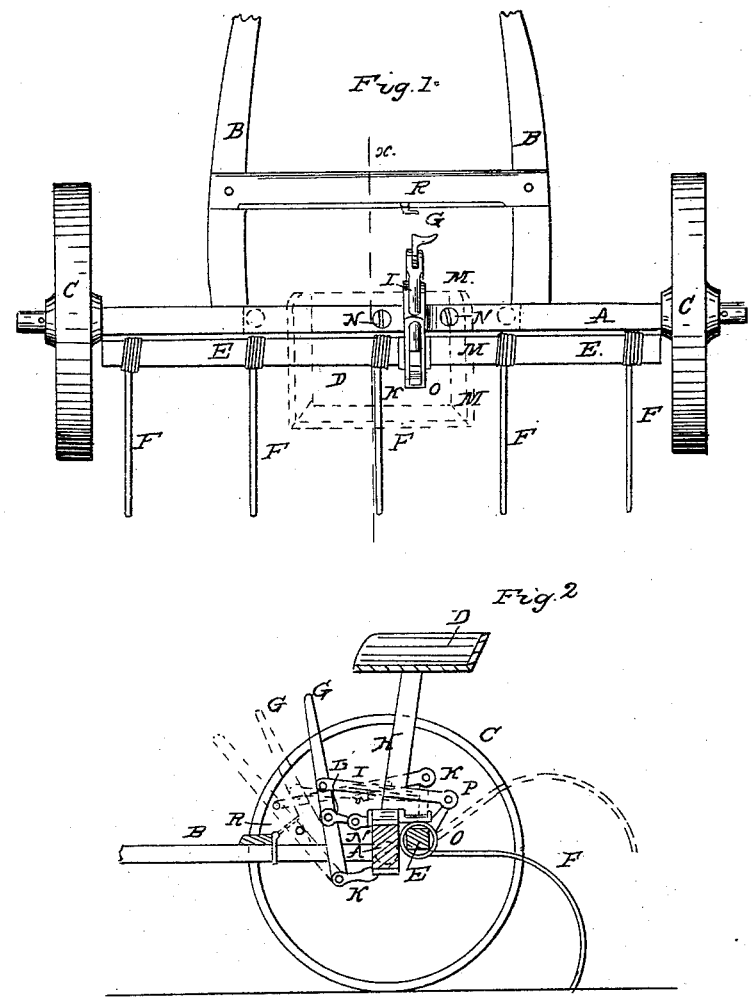

UNITED STATES PATENT OFFICE.

WILLIAM HOLMES, OF CLARKSVILLE, NEW YORK.

IMPROVEMENT IN HORSE HAY-RAKES.

Specification forming part of Letters Patent No. 82,002, dated September 8, 1868.

*To all whom it may concern:*

Be it known that I, WILLIAM HOLMES, of Clarksville, in the county of Albany and State of New York, have invented certain new and useful Improvements in Horse-Rakes, of which the following is a full, clear, and exact description.

The object of my invention is to raise and lower and firmly to hold the teeth of a horse-rake in a working position by devices simple in construction and operation.

The improvements herein claimed consist, first, in a locking-bolt jointed to a lever operated by the driver, this bolt sliding in a guideway on the axle of the machine, and resting upon a rock-shaft carrying the teeth when the latter are depressed, substantially as hereinafter set forth; second, in a novel method of combining devices for raising and depressing the rake-teeth with a lever operated by the driver.

In the accompanying drawings, which illustrate one convenient way of carrying out the objects of my invention, Figure 1 represents a plan or top view of my improved rake, with the driver's seat in dotted lines; and Fig. 2, a vertical transverse section at the line $x$ $x$ of Fig. 1.

An axle, A, to which shafts B are rigidly attached, is mounted upon wheels C C, and sustains a driver's seat, D. A rock-shaft, E, is hinged in rear of the axle, and carries rake-teeth F, the upper ends of the teeth being coiled around the shaft in the usual well-known way. A lever, G, is pivoted at its lower end to a bracket, H, secured to the under side of the axle. About midway of the lever G a rod, I, is pin-jointed. The rear portion of this rod is smaller than its front, and enters, through a mortise of proper size, a link or loop, K, hinged on the rake-shaft E. This rod is kept in the link by a shoulder near its center and an enlargement on its end, or by a nut screwed on the end. This mode of connecting the rod and link admits of the free movement back and forth of the former in the latter until either the shoulder or enlargement on the rod comes in contact with the loop. To the lever G, beneath the rod I, is jointed a short link, L, which has also suitably jointed to it a wide bar or locking-bolt, M, moving backward and forward in a bracket or guideway, N, on the axle beneath the driver's seat. The rear under edge of this locking-bar is beveled, and slides upon an inclined metal guard-piece, O, from which projects upwardly the support P, to which is hinged the link K, connected by the rod I with the lever. Projections on the ends of the sliding bar M confine it to the guideway N.

The teeth can be held in an elevated position by the hook R, secured upon the cross-piece between the shafts, the hook fitting around the lever G.

The operation is as follows: The parts being in the position shown by the black lines in Fig. 2, and a sufficient quantity of hay having been gathered, the driver bears upon the lever, inclining it forward. When it has reached the position indicated in dotted black lines the link-rod has been moved forward until its rear end abuts against the inside of the front of the loop K, and the locking-bar M has been drawn off the shield O, leaving the rake-shaft free to turn. So far the teeth remain at work. Continued pressure upon the lever turns the rake-shaft and elevates the teeth, discharging the hay accumulated by them. The lever being released, the weight of the rock-shaft and teeth causes the former to rock or turn, and the latter to touch the ground, in which position they are firmly held by the rocking arm, which has been protruded and rests upon the rock-shaft. The driver may quicken this return movement of the teeth by drawing the lever toward him.

As the first forward movement of the lever does not begin to turn the rake-shaft, and consequently there being no resistance to this movement, as it only acts upon the locking-bar to retract it, it is obvious that heavy loads may be discharged with but slight exertion on the part of the operator, the forward motion acquired by the lever greatly aiding him to overcome the first resistance offered by the weight of the hay upon the teeth.

Manifestly my improvement is capable of being greatly modified. For instance, two or more locking-bars may be operated by the same lever, if desired, (such as an arm having a locking-bar at each end, and centrally pivoted to the lever,) or a rod hooked at its rear end may be substituted for the rod I and loop K. When this rod is employed, the short arm of the loop at its end should be passed through an eye on the rock-shaft, and the loop project back of it when the teeth are depressed, to allow the lever to be moved forward to retract the locking-bar before acting on the shaft.

What I claim as my invention, and desire to secure by Letters Patent, is—

1. The locking-bolt M, moving in a guideway on the axle, and operated by means of the lever to hold the teeth down, substantially as set forth.

2. The combination, substantially as set forth, of the lever operated by the foot of the driver, and the devices for depressing and elevating the rake-teeth.

In testimony whereof I have hereunto subscribed my name.

WILLIAM HOLMES.

Witnesses:
    D. P. LATTA,
    I. HOUCK.